United States Patent [19] [11] 4,358,080
Wolker [45] Nov. 9, 1982

[54] FASTENER CLIP FOR DETACHABLY SECURING FUNCTIONAL COMPONENTS TO THREADED PINS FIXED TO A SUPPORT PLATE

[75] Inventor: Gunter Wolker, Lörrach, Fed. Rep. of Germany

[73] Assignee: A. Raymond, Lörrach, Fed. Rep. of Germany

[21] Appl. No.: 202,425

[22] Filed: Oct. 30, 1980

[30] Foreign Application Priority Data

Nov. 6, 1979 [DE] Fed. Rep. of Germany ....... 2944748

[51] Int. Cl.³ .............................................. F16L 3/22
[52] U.S. Cl. .................................. 248/68 R; 24/339; 174/166 R; 174/175; 248/74 A; 411/432; 411/437
[58] Field of Search ...................... 403/389, 390, 391; 24/257, 339; 411/437, 436, 432, 422, 427; 248/68 R, 74 A, 73, 221.4, 221.3; 339/22 B, 119 R, 198 GA; 174/157, 166 R, 40 CC, 175

[56] References Cited

U.S. PATENT DOCUMENTS

| T100,605 | 5/1981 | Christian | 174/166 R X |
|---|---|---|---|
| 2,364,668 | 12/1944 | Simmons | 411/437 |
| 3,588,011 | 6/1971 | Peres | 248/74 A X |
| 3,789,724 | 2/1974 | Moran | 411/432 |

FOREIGN PATENT DOCUMENTS

| 833191 | 10/1938 | France | 411/427 |
|---|---|---|---|
| 1297663 | 11/1972 | United Kingdom | 248/73 |

Primary Examiner—Ramon S. Britts
Assistant Examiner—Ramon O. Ramirez
Attorney, Agent, or Firm—Finnegan, Henderson, Farabow, Garrett & Dunner

[57] ABSTRACT

A fastener clip for detachably securing functional elements to a support plate through threaded pins rigidly joined to the plate which includes holding members forming channels which receive the functional components and a fastening hole between the channels and adapted to receive the threaded fastener. The fastening hole has an inside diameter slightly less than the outside diameter of the pin and is interrupted by a plurality of apertures extending through opposite side walls of the clip between the channels. Semi-circular wall portions at the end of each aperture define the fastening hole and elastically yield when the clip is forced on the threaded pin.

4 Claims, 7 Drawing Figures

FASTENER CLIP FOR DETACHABLY SECURING FUNCTIONAL COMPONENTS TO THREADED PINS FIXED TO A SUPPORT PLATE

BACKGROUND OF THE INVENTION

The present invention relates to fastener clips, and more particularly to a fastener clip constructed of hard-elastic plastic and useful to detachably secure functional components or parts to a support plate through threaded pins rigidly joined to said plate. The clip includes holding members forming channels adapted to receive and retain the functional components, and is provided with a fastening hole having an inside diameter slightly less than the outside diameter of the threaded pin to which the clip is to be secured. The clip is secured to the threaded pin by driving the pin into the fastening hole using a hammer or other suitable means against the clip.

One example of functional components to be detachably secured to a support plate with which the invention finds use is brake lines which are to be secured to a body wall of a motor vehicle. In this installation, it is important that the fastener clip can be quickly and permanently secured to a threaded pin fixed to the body wall and, if need be, that the clip can be easily removed from the threaded pin. It is furthermore necessary to ensure that the clip will not become loose as a result of vibrations or other forces exerted on it. In that respect, known fastener clips formed with smooth-walled fastening holes are not satisfactory. This is because the wall of the fastening hole is abraded by the sharp edges of the threads when the clip is forced on the threaded pin, whereby the adhesion or holding power of the clip on the pin is substantially reduced. Also, this type of clip is relatively expensive to manufacture because the orientation of the fastening hole to the spring arms requires multiple mold-ejection sliders.

SUMMARY OF THE INVENTION

It is therefore a main object of the invention to provide a fastener clip having a fastening hole construction adapted to securely grip a threaded pin when driven thereon and which strongly adheres to the pin even when the pin is covered with thick layers of enamel and/or foamed-on insulating material as is the case sometimes in motor vehicle body walls.

It is a further object to provide a fastener clip of the above character which can be removed from a threaded pin and reused if desired.

It is a still further object of the invention to provide a fastener clip of the foregoing type which can be manufactured by simplified techniques and which does not require multiple mold-ejection sliders.

To achieve the objects and in accordance with the purpose of the invention, as embodied and broadly described herein, the present invention finds use in a one-piece fastener clip of the type which is constructed of hard-elastic plastic and which is operable to detachably secure functional components to a support plate through a threaded pin rigidly joined to the plate, the clip including holding members formed by elastic spring arms extending laterally to opposite sides of the clip and forming parallel channels adapted to receive and retain the functional components, the clip being formed with a fastening hole between the channels having an inside diameter slightly less than the outside diameter of the threaded pin which is adapted to be driven into the fastening hole; and is directed to the improvement wherein the fastening hole is interrupted by a plurality of apertures extending through opposite side walls of the clip between the channels, and to the fastening hole the apertures having a width substantially equal to the diameter of the fastening hole, the apertures at each side wall of the clip being arranged one above the other and the apertures at one side wall of the clip being alternate to the apertures at the opposite clip side wall, the apertures having aperture side walls extending parallel to the channels formed by the holding members said apertures forming a plurality of surface which are spaced axially of one another along substantially the entire axial length of said hole.

Broadly, the fastener clip has semi-circular wall portions at the end of each aperture which define the fastening hole and which are elastically yieldable when the clip is forced onto the threaded pin, so that the wall portions will be less abraded than is the case for a smooth walled fastening hole.

Furthermore some of the semi-circular wall portions bend back and penetrate into the threads on the pin and provide a secure locking connection with the pin, so that the holding power of the clip is further increased.

Besides providing a savings in material for the clip, the apertures also simplify the mold construction by allowing use of only a single mold-ejection slider. With this construction, the mold parts required for forming the apertures can be drawn apart in the same direction as the mold parts for the spring arms which form the channels.

The features of the invention and their advantages will become clear in relation to the description below of an embodiment in connection with the drawings which are incorporated in and constitute a part of this specification, and which together with the description serve to explain the principles of the invention.

DESCRIPTION OF THE PREFERRED EMBODIMENT

Figure 1:
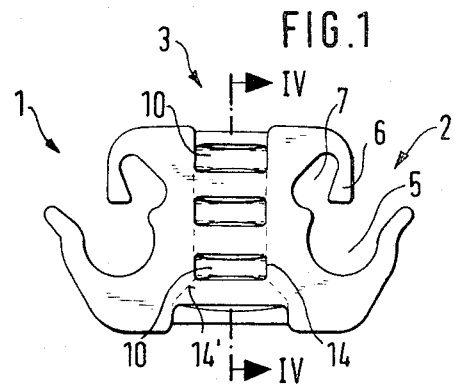
FIG. 1 is an englarged sideview of a fastener clip embodying the present invention.
Figure 2:
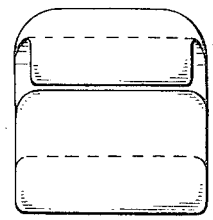
FIG. 2 is an end view of FIG. 1.
Figure 3:
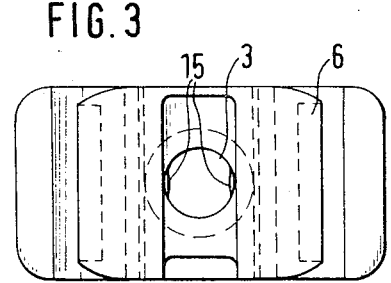
FIG. 3 is a top view of FIG. 1.
Figure 5:
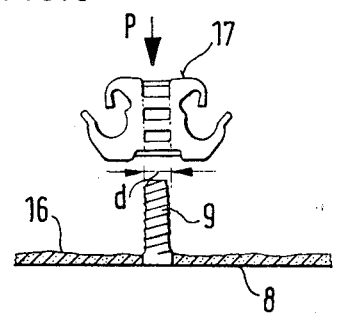
FIG. 5 shows a fastener clip of standard size prior to being pressed on a threaded pin.

A fastener clip of the type to which this present invention relates is shown in FIGS. 1–3 and includes a molded member constructed of a hard-elastic plastic. The clip includes two holding members, generally indicated at 1 and 2, and a fastening hole 3 at the center of the clip and between the holding members and which is adapted to receive a threaded pin 9 welded on or otherwise rigidly joined to a support plate 8. The threaded pin 9 is driven into the fastening hole 3, for example, by applying pressure against or by hammer blows striking a flat surface 17 on the clip, the pressure or blows being applied in the direction of arrow "P" (FIG. 5).

Figure 6:
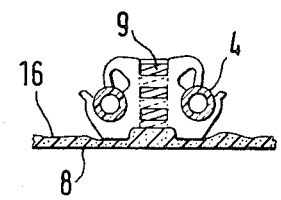
FIG. 6 shows the fastener clip pressed onto the threaded pin with two assembled brake lines retained in place thereon.

The holding members 1 and 2 form channels 5 and include elastic spring arms 6 to receive and retain cylindrical functional parts 4 such as brake lines, tubing, cables and the like (FIG. 6). The arms 6 are adapted to deflect into a clearance 7 when the components 4 are pressed into the channels 5 and then spring back into retaining position over the components 4. The components 4 can be removed from the channels 5 by first deflecting the spring arms 6 back into clearances 7 and then lifting the components 4 out of the channels 5.

In accordance with the invention, the fastening hole is interrupted by a plurality of apertures extending through opposite side walls of the clip between the channels, the apertures having a width substantially equal to the diameter of the fastening hole and side walls parallel to the channels. As embodied herein and shown in FIGS. 1 and 4, a plurality of apertures 10 extend through opposite side walls 18, 18 of the clip between the channels 5. The apertures 10 have a width substantially equal to the diameter of the fastening hole 3 and have aperture side walls 14 which extend parallel to the channels 5.

Figure 4:
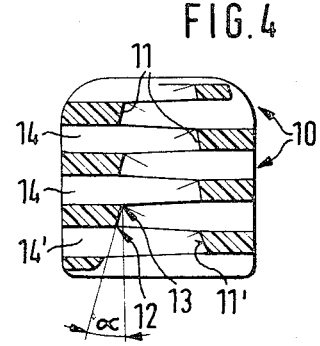
FIG. 4 is a sectional view of FIG. 1 taken along the line IV—IV.

In accordance with the invention, the apertures in each side walls of the clip are arranged one above the other, and the apertures in one side wall of the clip are alternate to the apertures in the opposite clip side wall. As embodied herein and shown in FIGS. 1 and 4, the apertures 10 in each side wall 18, 18 of the clip are arranged one above the other. As shown in FIG. 4, the apertures 10 in one side wall 18 are alternate or between the apertures in the other side wall 18 of the clip.

In accordance with the invention, the clip is formed with semi-circular wall portions at the end of each aperture which form the fastening hole, and the semi-circular wall portions are beveled outwardly in the direction of application of the clip to a threaded pin. As embodied herein, semi-circular wall portions 11 define the end of each aperture 10. The wall portion 11 formed by the apertures 10 form surfaces which are spaced axially of one another along substantially the entire axial length of the fastening hole as is evident from FIG. 4. As seen in FIG. 4, the facing semi-circular wall portions 11 form the fastening hole 3.

As further embodied herein, the semi-circular wall portions 11 are beveled outwardly of the direction of application of the clip to the threaded pin 9 that the smallest width between the wall portions measured across the diameter of hole 3 is at their upper, inwardly projecting edges 13 (FIG. 4). This width, as measured across the diameter of the fastening hole 3, is slightly less than the outside diameter "d" of the threaded pin 9. It has been found that the clip can be pressed on the threaded pin 9 with a reasonable force if the width between edges 13 is from about 5 to about 15% less than the outside diameter of the threaded pin 9. The width between lower edges 12 of the wall portions 11 measured across the diameter of hole 3 is slightly greater than the pin outside diameter d.

In accordance with the invention and as embodied herein, it is advantageous that the middle arcuate regions of the semi-circular wall portions 11 slope at an angle of from about 10 to about 15° relative to the axis of fastening hole. This is represented by angle α in FIG. 4. Angle α gradually decreases to about 0° where the wall portions 11 merge into side walls 14 of apertures 10. The width between wall portions 11 at the merge point with side walls 14 and the width between side walls 14, both measured across the diameter of hole 3, corresponds approximately to the outside diameter of the threaded pin 9.

In order to faciliate easy introduction of the threaded pin 9 into the fastening hole 3, the lowermost semi-circular wall portion 11' and the adjoining cavity side walls 14' are sloped outwardly at an angle of from about 30 to about 45° relative to the axis of fastening hole 3 to form an insertion funnel. In addition, the outward flaring so resulting in the fastening hole 3 and also the adjoining cavity 10 offer the advantage that foamed insulating material 16 foamed onto the support plate 8 can escape into the free space when the clip is being driven on the pin 9 and against the plate 8.

It will be appreciated that, in accordance with the invention and as embodied herein, when the clip is forced onto the threaded pin 9, the semi-circular wall portions 11 elastically yield so that abrasion of them is kept to a minimum. Furthermore, when the clip is in position on the threaded pin 9, some of the semi-circular wall portions bend back and penetrate into the threads on the pin and provide a secure locking connection for the clip on the pin.

If it is desired to remove the clip from the threaded pin 9, that can be achieved simply by turning the clip in a counter-clockwise direction as viewed in FIG. 3.

Figure 7:
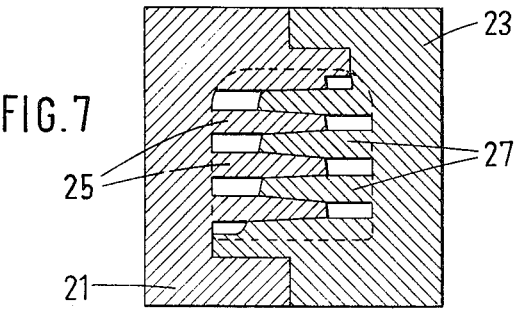
FIG. 7 is a sectional view showing molding dies used to form the fastener clip of this invention.

The fastener clip of this invention is appropriately manufactured using a molding die as shown in FIG. 7. The die is made of two parts 21, 23 which include molding laminations 25, 27, respectively, formed with convex semi-circular ends and mounted to the opposite inside walls of the mold parts 21, 23. The laminations 25, 27 engage mutually in the manner of a zipper when the two mold parts 21, 23 are closed. In order to easily withdraw the laminations 25, 27 from the molded clip, the mutually engaging ends of the laminations should be conically beveled in the direction of engagement. It is furthermore appropriate that the mutually parallel edges of the molding laminations 25, 27 be chamfered or rounded off into the front circular area. In this manner, projecting molding attachments 15 are formed in the fastening hole 3 of the clip. This attachments 15 point inwardly and provide an additional holding effect on the threaded pin.

It should be noted that the clip of this invention can be used not only with threaded pins but also on cylindrical pins with smooth, roughened or finely knurled surfaces particularly if it does not matter that the clip be easily detached from that pin.

It will be apparent to those skilled in the art that various additives, substitutions, modifications, and omissions may be made to the invention without departing from the spirit of the invention.

What I claim is:

1. In a one-piece fastener clip of the type constructed of hard-elastic plastic and operable to detachably secure functional components to a support plate through a threaded pin rigidly joined to said plate, said clip including holding members formed by elastic spring arms extending laterally to opposite sides of said clip and forming parallel channels adapted to receive and retain the functional components, said clip being formed with a fastening hole between said channels having an inside diameter slightly less than the outside diameter of the threaded pin which is adapted to be driven into the fastening hole; the improvement wherein said fastening hole is interrupted by a plurality of apertures extending through opposite side walls of said clip between said channels and to said fastening hole, said apertures having a width substantially equal to the diameter of said fastening hole, said apertures at each side wall of said clip being arranged one above the other and the apertures at one side wall of said clip being alternate to the apertures at the opposite clip side wall, said apertures having aperture side walls extending parallel to said channels formed by said holding members, said apertures forming a plurality of surfaces which are spaced axially of one another along substantially the entire axial length of said hole.

2. The improvement as claimed in claim 1, wherein said clip is formed with semi-circular wall portions at the end of each aperture and which form the fastening hole, said wall portions being beveled outwardly in the direction of application of said clip to a threaded pin, the smallest width between said wall portions, as measured across the diameter of said fastening hole, being from about 5 to about 15% smaller than the outside diameter of said threaded pin, said semi-circular wall portions being elastically yielding during insertion of said threaded pin and adapted to bend back and penetrate the threads on said pin after its insertion into said fastening hole.

3. The improvement as claimed in claim 2, said semi-circular wall portions being at an angle of from about 10° to about 15° with respect to the longitudinal axis of said fastening hole at their middle arcuate area and gradually decreasing to about 0° where said wall portions merge into said cavity side walls, said aperture side walls being spaced apart a distance approximately equal to the outside diameter of said threaded pin.

4. The improvement as claimed in claims 1, 2, or 3 wherein the lowermost one of said semi-circular wall portions and the adjoining aperture side walls are sloped outwardly at an angle from about 30° to about 45° to form an insertion funnel for said threaded pin.

* * * * *